(12) United States Patent
Nelson et al.

(10) Patent No.: US 9,871,382 B2
(45) Date of Patent: Jan. 16, 2018

(54) METHOD AND CONTROLLER FOR CONTINUOUSLY OPERATING A PLURALITY OF ELECTRIC ENERGY GENERATING MACHINES DURING A HIGH VOLTAGE CONDITION

(71) Applicant: Siemens Aktiengesellschaft, Munich (DE)

(72) Inventors: Robert J. Nelson, Orlando, FL (US); Najlae M. Yazghi, Orlando, FL (US); William F. Clark, Oviedo, FL (US)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 249 days.

(21) Appl. No.: 14/427,779

(22) PCT Filed: Apr. 29, 2013

(86) PCT No.: PCT/EP2013/058861
§ 371 (c)(1),
(2) Date: Mar. 12, 2015

(87) PCT Pub. No.: WO2014/056633
PCT Pub. Date: Apr. 17, 2014

(65) Prior Publication Data
US 2015/0249338 A1    Sep. 3, 2015

Related U.S. Application Data

(60) Provisional application No. 61/712,844, filed on Oct. 12, 2012.

(51) Int. Cl.
*H02J 4/00* (2006.01)
*H02J 3/38* (2006.01)
*H02J 3/18* (2006.01)

(52) U.S. Cl.
CPC .............. *H02J 4/00* (2013.01); *H02J 3/1885* (2013.01); *H02J 3/382* (2013.01); *H02J 3/383* (2013.01);
(Continued)

(58) Field of Classification Search
CPC .. H02J 4/00; H02J 3/1885; H02J 3/382; H02J 3/383; H02J 3/386; Y10T 307/718; Y02E 10/563; Y02E 10/763; Y02E 40/32
(Continued)

(56) References Cited

U.S. PATENT DOCUMENTS

2010/0025994 A1    2/2010  Cardinal et al.
2010/0207463 A1    8/2010  Letas Heinz-Hermann
(Continued)

FOREIGN PATENT DOCUMENTS

CN    101278453 A    10/2008
CN    101640419 A    2/2010
(Continued)

OTHER PUBLICATIONS

International Search Report and Written Opinion for PCT/EP2013/058861, dated Sep. 18, 2013 (12 pages).*
(Continued)

*Primary Examiner* — Hal Kaplan
(74) *Attorney, Agent, or Firm* — Beusse Wolter Sanks & Maire

(57) ABSTRACT

A method and a controller for continuously operating a plurality of electric energy generating machines during a high voltage condition at a point of common coupling of the plurality of electric energy generating machines are provided herein. The method includes a) sensing a voltage level at the point of common coupling exceeding a permitted voltage level; b) curtailing an active power output of the plurality of electric energy generating machines such that a
(Continued)

reactive capability of the plurality of electric energy generating machines is increased; c) establishing a set point of an electric quantity being present at the point of common coupling such that a reactive electric component providable by the electric energy generating machines is increased; and d) controlling an electric energy generating machine based on the set point of the electric quantity such that the high voltage condition at common coupling is at least partially remedied.

14 Claims, 1 Drawing Sheet

(52) U.S. Cl.
CPC ............. *H02J 3/386* (2013.01); *Y02E 10/563* (2013.01); *Y02E 10/763* (2013.01); *Y02E 40/32* (2013.01); *Y10T 307/718* (2015.04)

(58) Field of Classification Search
USPC .......................................................... 307/84
See application file for complete search history.

(56) References Cited

U.S. PATENT DOCUMENTS

| 2010/0292852 | A1 | 11/2010 | Gertmar et al. |
| 2011/0031762 | A1 | 2/2011 | Letas |
| 2012/0150524 | A1 | 6/2012 | Nielsen et al. |
| 2013/0187384 | A1 | 7/2013 | Li et al. |

FOREIGN PATENT DOCUMENTS

| CN | 102007662 | A | 4/2011 |
| CN | 102570496 | A | 7/2012 |
| CN | 102624034 | A | 8/2012 |
| CN | 102834996 | A | 12/2012 |
| EP | 2209205 | A1 | 7/2010 |
| WO | 2011032265 | A1 | 3/2011 |
| WO | 2011120523 | A2 | 10/2011 |
| WO | 2012076015 | A2 | 6/2012 |
| WO | 2012076015 | A3 | 8/2012 |

OTHER PUBLICATIONS

CN Office Action dated Jul. 5, 2016, for CN application No. 201380053049.7.
CN Office Action dated Jul. 5, 2017, for CN patent application No. 201380053049.7.
CN Second Office Action dated Dec. 29, 2016, for CN patent application No. 201380053049.7.

\* cited by examiner

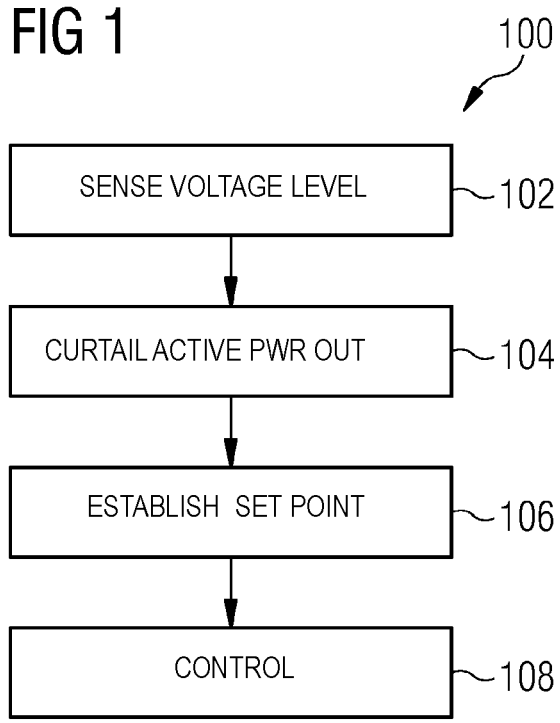
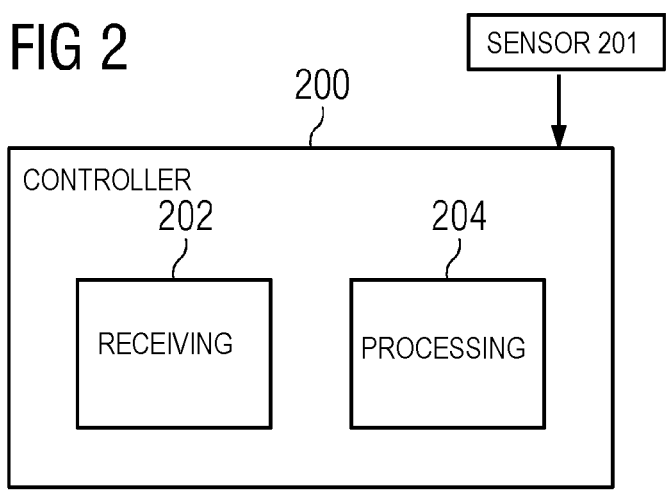

US 9,871,382 B2

METHOD AND CONTROLLER FOR CONTINUOUSLY OPERATING A PLURALITY OF ELECTRIC ENERGY GENERATING MACHINES DURING A HIGH VOLTAGE CONDITION

CROSS REFERENCE TO RELATED APPLICATIONS

This application is the US National Stage of International Application No. PCT/EP2013/058861 filed Apr. 29, 2013, and claims the benefit thereof. The International Application claims the benefit of U.S. Provisional Application No. 61/712,844 filed Oct. 12, 2012. All of the applications are incorporated by reference herein in their entirety.

FIELD OF INVENTION

The present invention relates to the field of electric energy generating machines. In particular, the invention relates to a method for continuously operating a plurality of electric energy generating machines during a high voltage condition at a point of common coupling of the plurality of electric energy generating machines. Further, the invention relates to a controller for continuously operating a plurality of electric energy generating machines during a high voltage condition at a point of common coupling of the plurality of electric energy generating machines. Furthermore, the invention relates to an energy facility, such as wind or solar photovoltaic plant and a computer program or automatic control.

ART BACKGROUND

In order to supply power to a power grid, an electric energy generating machine, in particular a plurality of electric energy generating machines such as a plurality of wind turbines in a wind park or a plurality of solar photovoltaic machines in a solar plant, controlled by a centralized plant controller, needs to conform to certain requirements. For example, the electric energy generating machine may need to offer the capability to remain on-line and continue to produce power during high-voltage conditions on the connected transmission or distribution system. This can be described as a high voltage ride through (HVRT) capability. HVRT capability would require that the electric energy generating machine remain connected to the power grid during a high voltage condition to enhance the stability of the grid.

EP 2 209 205 A1 discloses a method for operating a wind power plant with a rotor-driven electric generator for delivering electric power to an electric grid which provides a grid voltage. The method includes that, when excess voltage prevails in the grid, idle or reactive power from the wind power plant is fed to the grid in order to lower the voltage and that a monitoring occurs to determine whether a voltage was lowered within a predeterminable time to a predeterminable reference value and/or an idle or reactive current is delivered which is greater than or equal to a predeterminable idle current reference value. However, this scheme makes no provisions to adjust active power production to release reactive capability of the wind turbines. Additionally, this disclosed method applies exclusively to rotor-driven wind turbines with available reactive current. This method also requires a considerable amount of analysis to establish the necessary predeterminable values, which may vary from site to site.

There may be a need for a simple, effective, and efficient voltage regulation during high voltage conditions, using a central plant controller.

SUMMARY OF THE INVENTION

This need may be met by the subject matter according to the independent claims. Advantageous embodiments of the present invention are described by the dependent claims.

According to an aspect of the invention a method is provided for continuously operating a plurality of electric energy generating machines during a high voltage condition at a point of common coupling of the plurality of electric energy generating machines. The method includes a) sensing that a voltage level at the point of common coupling is exceeding a permitted voltage level; b) curtailing an active power output of the plurality of electric energy generating machines in such a manner that a reactive capability of the plurality of electric energy generating machines is increased; c) establishing a set point of an electric quantity being present at the point of common coupling in such a manner that a reactive electric component (e.g., reactive current or reactive power) available from or providable by the plurality of electric energy generating machines is increased; and d) controlling at least one of the plurality of electric energy generating machines based on the established set point of the electric quantity in such a manner that the high voltage condition at the point of common coupling is at least partially remedied.

An electric energy generating machine may be a turbine, particularly a wind turbine, a solar photovoltaic machine, or a steam turbine or gas turbine. A plurality of electric energy generating machines may be installed in close vicinity with respect to each other and may form an electric energy generating farm or park or plant. Within such an electric energy generating plant, the electric power generated by the plurality of electric energy generating machines is aggregated at a common collector bus (bus bar), which hereinafter is also denominated a Point of Common Coupling (PCC). In case a voltage level or a value of a voltage measured or sensed at the point of common coupling is higher than a permitted continuous voltage level, one speaks of a high voltage condition.

An electric power output in a system comprising an electric energy generating machine producing alternating current power is usually described as the sum of an active power output P and a reactive power output Q. The active power, or real power, is a capacity of the system for performing work in a particular time at a load coupled to the system, whereas reactive power does not perform work at the load coupled to the system. The part of a current corresponding to the active power (which is in phase with the line to ground voltage) is called active current and the part of the current corresponding to the reactive power (which is ninety degrees out of phase with the line to ground voltage) is called reactive current. A reactive capability of an electric energy generating machine is the capability to generate reactive current and reactive power, which is proportional to the product of the reactive current magnitude and the voltage magnitude. Reactive current and reactive power may be used to control system voltage.

Generation facilities or electric energy generating machines are normally either current limited or power limited. Typically, converters are current-limited and synchronous generators and other electromagnetic machines are power-limited. That is, converters normally have limits of total current that can be produced. In generators and other electromagnetic machines, there is some trade off between voltage and current capability, but the product of the voltage and current (proportional to the power) generally constitutes the operating limit. Regardless, if it is desired to increase reactive current (or reactive power), it is beneficial to reduce the active current or active power from a generation source to make additional reactive capability available for voltage regulation.

In accordance with this invention, if a high system voltage level is sensed or detected, in other words a sensed or measured voltage level or value of a voltage exceeds a permitted voltage level, the active power output of the plurality of electric energy generating machines is curtailed or reduced to allow the machines to produce more reactive current for voltage control. In particular, the active power output is curtailed in such a manner that a reactive current capability of the plurality of electric energy generating machine is increased. Thus, the plurality of electric energy generating machines may be capable of generating or producing more reactive current to reduce the system voltage.

In order to increase a reactive current provided by the plurality of electric energy generating machines, a set point of an electric quantity being present at the point of common coupling may be established or chosen. In particular, the electric quantity may be a current and/or a voltage being present at the point of common coupling. Further, the established set point may ensure that the reactive current provided by the plurality of electric energy generating machines is increased. At least one electric energy generating machine of the plurality of electric energy generating machines may be controlled based on the established set point of the electric quantity in such a manner that the high voltage condition at the point of common coupling is at least partially remedied.

According to an exemplary embodiment, the reactive electric component is a reactive current $I_q$ or a reactive power Q.

According to a further exemplary embodiment, the established set point of the electric quantity is a set point of a voltage present at the point of common coupling.

Establishing the set point of the voltage present at the point of common coupling may allow for an efficient way for increasing the reactive current provided by the plurality of electric energy generating machines. This allows, as a result, for an efficient way to remedy a high voltage condition at the point of common coupling.

According to a further exemplary embodiment, an active electric component provided by the plurality of electric energy generating machines is reduced in such a manner that the reactive electric component that is providable by the plurality of electric energy generating machines may be increased.

As is well known to those familiar with the art, generating plants are often described as absorbing (rather than providing) reactive power when they reduce system voltage. As used in this document, the reactive power provided is sometimes characterized as "leading" reactive power, using generator convention because the phase of the reactive current is advanced by 90 electrical degrees compared to the phase to ground voltage of that phase (using the convention that the current leaves the generator). Although this is sometimes characterized as negative reactive power by convention, additional leading reactive power requires additional reactive current and additional reactive capability to reduce system voltage.

Reducing the active current $I_p$ may allow for an efficient way to increase a reactive current $I_q$, and consequently for a more efficient way to remedy a high voltage condition at the point of common coupling.

According to a further exemplary embodiment, the active electric component is an active current $I_p$ or an active power P.

According to a further exemplary embodiment, the reactive electric component is increased in such a manner that a maximal current $I_{max}$ or a maximum apparent power, $S_{max}$, provided by the plurality of electric energy generating machines is attained.

The apparent power S is given $S=\sqrt{(P^2+Q^2)}$, where P is the active power of the system and Q is the reactive power of the system. For example, the maximal apparent power $S_{max}$ of a synchronous machine is given by $Smax=3V_gI_p$, where $V_g$ is the rms phase voltage and $I_p$ is the rms phase line-ground current.

In particular, attaining or keeping the total current or apparent power at the maximal level may allow for a more efficient and stable way to remedy a high voltage condition at the point of common coupling.

According to a further exemplary embodiment, the reactive current capability $I_q$ is increased to a maximum reactive current capability ($I^{max}_q$) in accordance with the relation $I^{max}_q=\sqrt{(I_{max}^2-I_p^2)}$ or the leading reactive power capability is increased to a maximum leading reactive power capability ($Q_{max}$) in accordance with the relation $Q_{max}=\sqrt{(S_{max}^2-P^2)}$.

In particular, the relation $I^{max}_q=\sqrt{(I_{max}^2-I_p^2)}$ or $Q_{max}=\sqrt{(S_{max}^2-P^2)}$ may allow an increase in the reactive current or leading reactive power that can be provided by the machine by reducing the active current or active power in such a manner that the generating machine is fully utilized.

According to a further exemplary embodiment, the at least one of the plurality of electric energy generating machines is a wind turbine. According to a further exemplary embodiment, the plurality of electric energy generating machines forms a wind plant.

In particular, electric energy generating machines using wind energy connected to a power grid need to fulfil certain grid requirements in order to maintain an overall stability of the power grid. Since wind cannot be controlled, it may be necessary to disconnect a wind turbine from the power grid in order to prevent a high voltage condition. However, due to the increased amount of wind energy production in some areas, a disconnection of a wind turbine, particularly a disconnection of a plurality of wind turbines, may also affect the operation of the power grid negatively. In particular, the described method may advantageously provide a high voltage ride through for a wind turbine during a high voltage condition, so that the turbines may be able to remain on line, providing active power and voltage support, albeit at reduced active power levels, which is supporting the operation of the system.

According to a further embodiment, the at least one of the plurality of electric energy generating machines is a solar photovoltaic machine.

According to a further aspect, a controller for continuously operating a plurality of electric energy generating machines during a high voltage condition at a point of common coupling of the plurality of electric energy generating machines is provided. The controller includes a receiving unit for receiving a sensor signal from a sensor sensing a voltage level at the point of common coupling exceeding a permitted voltage level and a processing unit for a) curtailing an active power output of the plurality of electric energy generating machines in such a manner that a reactive capability of the plurality of electric energy generating machines is increased; b) establishing a set point of an electric quantity being present at the point of common coupling in such a manner that a reactive electric component providable by the plurality of electric energy generating machines is increased; and c) controlling at least one of the plurality of electric energy generating machines based on the established set point of the electric quantity in such a manner that the high voltage condition at the point of common coupling is at least partially remedied.

According to a further aspect, an energy facility, in particular wind plant is provided comprising at least one wind turbine and the above described controller.

According to a further aspect, a computer program or automatic control for continuously operating a plurality of electric energy generating machines during a high voltage condition at a point of common coupling of the plurality of electric energy generating machines is provided, wherein the computer program or control, when executed by a processor, is adapted to perform the above described method.

As used herein, reference to a computer program is intended to be equivalent to a reference to a program element and/or to a computer readable medium containing instructions for controlling a computer system to coordinate the performance of the above described method.

The computer program or control may be implemented as computer readable instruction code in any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

Aspects of the invention may be realized by means of a computer program in software. However, an embodiment of the invention may also be realized by means of one or more specific electronic circuits in hardware. Furthermore, an embodiment of the invention may also be realized in a hybrid form, i.e. in a combination of software modules and hardware modules.

In particular, the computer program or control may be stored on a computer-readable medium. The computer-readable medium may be readable by a computer or a processor. The computer-readable medium may be, for example but not limited to, an electric, magnetic, optical, infrared or semiconductor system, device or transmission medium. The computer-readable medium may include at least one of the following media: a computer-distributable medium, a program storage medium, a record medium, a computer-readable memory, a random access memory, an erasable programmable read-only memory, a computer-readable software distribution package, a computer-readable signal, a computer-readable telecommunications signal, computer-readable printed matter, and a computer-readable compressed software package.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

BRIEF DESCRIPTION OF THE DRAWINGS

The aspects defined above and further aspects of the present invention are apparent from the examples of embodiment to be described hereinafter and are explained with reference to the examples of embodiment. Aspects of the invention will be described in more detail hereinafter with reference to examples of embodiment but to which the invention is not limited.

FIG. 1 shows a flowchart describing a method for continuously operating a plurality of electric energy generating machines during a high voltage condition according to an exemplary embodiment.

FIG. 2 shows a controller for continuously operating a plurality of electric energy generating machines during a high voltage condition according to an exemplary embodiment.

DETAILED DESCRIPTION

The illustrations in the drawings are schematically.

FIG. 1 shows a flowchart 100 depicting a method for continuously operating a plurality of electric energy generating machines during a high voltage condition at a point of common coupling of the plurality of electric energy generating machines. As indicated with reference numeral 102, a voltage level at the point of common coupling exceeding a permitted voltage level is sensed. If a voltage level at the point of common coupling is sensed which is higher than, or exceeds a permitted voltage level, an active power output of the plurality of electric energy generating machines is curtailed, as indicated with reference numeral 104. In particular, the active power output is curtailed in such a manner that a reactive power capability of the plurality of electric energy generating machines is increased. The increased reactive power capability of the plurality of electric energy generating machines is further used to increase a reactive current provided by the plurality of electric energy generating machines. This is achieved, as indicated by reference numeral 106, by establishing a set point of an electric quantity being present at the point of common coupling. The established set point makes use of the increased reactive current capability in such a manner that the reactive current provided by the plurality of electric energy generating machines is increased. In order to continuously operate the plurality of electric energy generating machines during a high voltage condition at the point of common coupling, at least one of the plurality of electric energy generating machines is controlled based on the established set point of the electric quantity in such a manner that the high voltage condition at the point of common coupling is at least partially remedied, as indicated with reference numeral 108.

FIG. 2 shows a controller 200 for continuously operating a plurality of electric energy generating machines during a high voltage condition at a point of common coupling of the plurality of electric energy generating machines. The controller includes a receiving unit 202 for receiving a sensor signal from a sensor 201 sensing a voltage level at the point of common coupling exceeding a permitted voltage level. The controller 200 further includes a processing unit 204 for curtailing an active power output of the plurality of electric energy generating machines in such a manner that a reactive current capability of the plurality of electric energy generating machines is increased. The processing unit 204 is further adapted to establish a set point of an electric quantity being present at the point of common coupling in such a manner that a reactive current provided by the plurality of electric energy generating machines is increased. Further, at least one of the plurality of electric energy generating machines is controlled based on the established set point of the electric quantity in such a manner that the high voltage condition at the point of common coupling is at least partially remedied.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

LIST OF REFERENCE SIGNS

100 Flowchart
102 sensing a voltage level at the point of common coupling
104 curtailing an active power output
106 establishing a set point
108 controlling
200 Controller
202 Receiving unit
204 Processing unit.

The invention claimed is:

1. A method for continuously operating a plurality of electric energy generating machines during a high voltage condition at a point of common coupling of the plurality of electric energy generating machines, the method comprising:
   sensing a voltage level at the point of common coupling exceeding a permitted voltage level;
   curtailing an active power output of the plurality of electric energy generating machines in such a manner that a reactive capability of the plurality of electric energy generating machines is increased;
   establishing a set point of an electric quantity being present at the point of common coupling in such a manner that a reactive electric component providable by the plurality of electric energy generating machines is increased; and
   controlling at least one of the plurality of electric energy generating machines based on the established set point of the electric quantity in such a manner that the high voltage condition at the point of common coupling is at least partially remedied.

2. The method according to claim 1, wherein the reactive electric component is a reactive current Iq or a leading reactive power Q.

3. The method according to claim 1, wherein the established set point of the electric quantity is a set point of a voltage present at the point of common coupling.

4. The method according to claim 1, wherein an active electric component provided by the plurality of electric energy generating machines is reduced in such a manner that the reactive electric component that is providable by the plurality of electric energy generating machines is increased.

5. The method according to claim 4, wherein the active electric component is an active current Ip or an active power P.

6. The method according to claim 1, wherein the reactive electric component is increased in such a manner that a maximal current Imax or maximal apparent power Smax providable by the plurality of electric energy generating machines is attained.

7. The method according to claim 1,
   wherein a reactive current capability Iq is increased to a maximum reactive current capability ($I^{max}_q$) in accordance with the relation $I^{max}_q = \sqrt{(I_{max}^2 - I_p^2)}$ or a leading reactive power capability is increased to a maximum leading reactive power capability ($Q_{max}$) in accordance with the relation $Q_{max} = \sqrt{(S_{max}^2 - P^2)}$.

8. The method according to claim 1, wherein the at least one of the plurality of electric energy generating machines is a wind turbine.

9. The method according to claim 8, wherein the plurality of electric energy generating machines form a wind plant.

10. The method according to claim 1, wherein the at least one of the plurality of electric energy generating machines is a solar photovoltaic machine.

11. A computer program stored on a non-transitory computer readable media for continuously operating a plurality of electric energy generating machines during a high voltage condition at a point of common coupling of the plurality of electric energy generating machines, wherein the computer program, when executed by a processor, is adapted to perform a method according to claim 1.

12. A controller for continuously operating a plurality of electric energy generating machines during a high voltage condition at a point of common coupling of the plurality of electric energy generating machines, the controller comprising:
   a receiving unit for receiving a sensor signal from a sensor sensing a voltage level at the point of common coupling exceeding a permitted voltage level; and
   a processing unit for curtailing an active power output of the plurality of electric energy generating machines in such a manner that a reactive capability of the plurality of electric energy generating machines is increased;
   establishing a set point of an electric quantity being present at the point of common coupling in such a manner that a reactive electric component providable by the plurality of electric energy generating machines is increased; and
   controlling at least one of the plurality of electric energy generating machines based on the established set point of the electric quantity in such a manner that the high voltage condition at the point of common coupling is at least partially remedied.

13. An energy facility comprising at least one wind turbine and the controller according to claim 12.

14. The energy facility of claim 13, wherein the energy facility comprises a wind plant.

* * * * *